US010829899B2

(12) United States Patent
Sturos

(10) Patent No.: US 10,829,899 B2
(45) Date of Patent: Nov. 10, 2020

(54) PARTIAL-CUT-WIDTH SENSING FOR COLD PLANAR

(71) Applicant: Caterpillar Paving Products Inc., Brooklyn Park, MN (US)

(72) Inventor: Timothy J. Sturos, Saint Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/138,077

(22) Filed: Sep. 21, 2018

(65) Prior Publication Data
US 2020/0095738 A1    Mar. 26, 2020

(51) Int. Cl.
*E01C 23/088* (2006.01)
*G01F 22/00* (2006.01)

(52) U.S. Cl.
CPC ........... *E01C 23/088* (2013.01); *G01F 22/00* (2013.01)

(58) Field of Classification Search
CPC ...... E01C 23/08; E01C 23/085; E01C 23/088; E01C 23/12; E01C 23/122; E01C 23/127
USPC .......................................... 404/84.1, 84.5, 94
See application file for complete search history.

(56) References Cited

U.S. PATENT DOCUMENTS

| 4,943,119 | A | * | 7/1990 | Zarniko | E01C 19/006 181/123 |
| 7,552,539 | B2 | * | 6/2009 | Piekutowski | E01C 19/006 33/1 CC |
| 8,246,270 | B2 | * | 8/2012 | Berning | E01C 23/088 404/84.1 |
| 8,794,867 | B2 | * | 8/2014 | Snoeck | E01C 23/088 299/39.6 |
| 8,888,194 | B2 | * | 11/2014 | Killion | E01C 23/122 299/1.5 |
| 8,899,689 | B2 | | 12/2014 | Killion | |
| 9,096,977 | B2 | * | 8/2015 | Fritz | G05D 1/0214 |
| 9,121,146 | B2 | * | 9/2015 | Paulsen | G01B 11/00 |
| 9,121,148 | B2 | | 9/2015 | Johnson | |
| 9,359,729 | B2 | * | 6/2016 | Fritz | G05D 1/0214 |
| 9,970,164 | B2 | * | 5/2018 | Fritz | G05D 1/0214 |
| 9,970,758 | B2 | * | 5/2018 | Shah | G01B 11/303 |
| 10,190,269 | B2 | * | 1/2019 | Shah | E01C 23/01 |
| 10,354,228 | B2 | | 7/2019 | Paulsen et al. | |
| 2002/0047301 | A1 | * | 4/2002 | Davis | E01C 19/006 299/1.5 |
| 2016/0040370 | A1 | * | 2/2016 | Paulsen | G01B 11/00 356/72 |
| 2017/0362784 | A1 | * | 12/2017 | Hoffmann | E01C 23/088 |

* cited by examiner

*Primary Examiner* — Gary S Hartmann
(74) *Attorney, Agent, or Firm* — Schwegman, Lundberg & Woessner

(57) ABSTRACT

A system for sensing partial-cut-width in a cold planar machine comprises a frame, a cutting system mounted to the frame comprising a cutting tool extending across a cutting path, sensors positioned across the cutting path, and a controller electronically coupled to the sensors to determine a partial-cut-width of material for the cutting tool. A method comprises sensing depth distances across a cut width of a cutting tool, determining a difference in depth distances, determining a location for the difference in depth distances, determining a portion of the cut width based on the determined location to determine a partial-cut-width.

20 Claims, 7 Drawing Sheets

US 10,829,899 B2

PARTIAL-CUT-WIDTH SENSING FOR COLD PLANAR

TECHNICAL FIELD

The present application relates generally, but not by way of limitation, to sensor systems and methods for cold planar machines, such as those that can be used to remove paved surfaces. More particularly, the present application relates to material removal sensor systems and methods.

BACKGROUND

Cold planar machines can be used to remove old or degraded pavement from roadway surfaces. Cold planar machines can utilize multiple sensor system to assist in removing material from the roadway surface. For example, cold planar machines can utilize sensors for determining road grade, cut depth and speed. Because each roadway being produced can have different parameters, such as thickness and width, not all parameters are effectively sensed in all situations.

U.S. Pat. No. 9,121,146 to Paulsen et al., entitled "Determining Milled Volume or Milled Area of a Milled Surface." discloses "at least one profile sensor configured to detect at least one profile parameter of a ground surface in front of" a milling drum.

SUMMARY OF THE INVENTION

A system for sensing partial-cut-width in a cold planar machine can comprise a cold planar frame, a cutting system mounted to the cold planar frame comprising a cutting tool extending across a cutting path about a rotational axis, a plurality of sensors positioned across the cutting path, and a controller electronically coupled to the plurality of sensors, the controller configured to determine a partial-cut-width of material in front of the cutting tool from output of the plurality of depth sensors.

A method for sensing partial-cut-width in a cold planar operation can comprise sensing a plurality of depth distances across a cut width of a cutting tool of a cold planar machine between a first end and a second end, determining a difference in depth distances of the plurality of depth distances, determining a location for the difference in depth distances along the cut width, determining a portion of the cut width based on the determined location of the difference in depth distances to determine a partial-cut-width, and outputting a partial-cut-width indicator.

DETAILED DESCRIPTION

Figure 1:
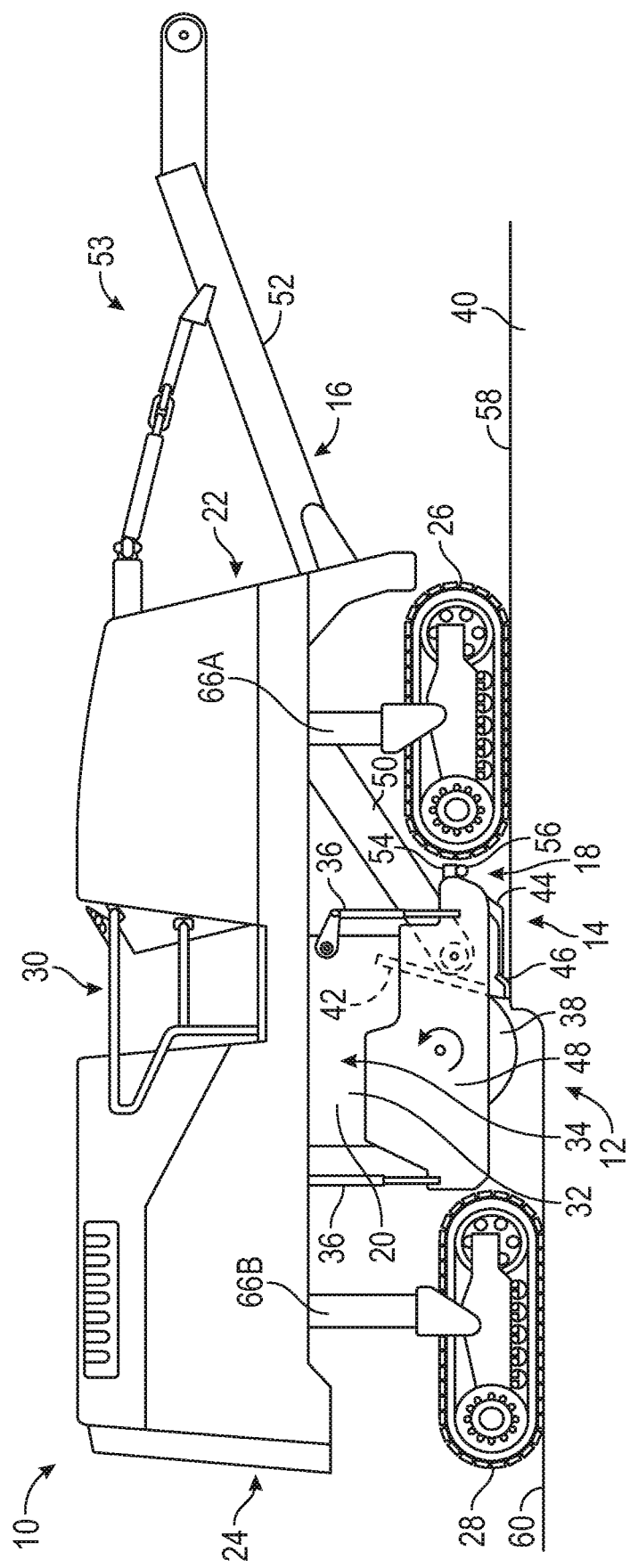
FIG. 1 is a schematic side view of a cold planar machine showing a cutting system, an anti-slabbing system, a conveyor system and a partial-cut-width sensor system.

FIG. 1 is a schematic side view of cold planar machine 10 showing cutting system 12, anti-slabbing system 14, conveyor system 16 and partial-cut sensor system 18.

Cold planer machine 10 can further comprise frame 20 comprising front frame end 22 and back frame end 24. Front propulsion elements 26 and back propulsion elements 28 can be coupled to frame 20 proximate front frame end 22 and back frame end 24, respectively. Each of propulsion elements 26 and 28 can include two parallel ground engaging tracks, although the present disclosure is not thereby limited. Operator control station 30 can be coupled to frame 20 and can comprise controller 84 (FIG. 6) for performing control and monitoring functions of cold planar machine 10. Cutting system 12 can be coupled to frame 20 and can comprise housing 32 defining cutting chamber 34 for rotatable cutter drum 38. Elevation control legs, or support posts, 66A and 66B can be provided to raise and lower housing 32, including chamber 34 with cutter drum 38, typically in conjunction with adjustments to a cutting depth of cutting system 12. Side plate cylinders 36 can be configured to adjust the height of side plate 48. Cutting system 12 can include a cutting tool, such as rotatable cutter drum 38 that can rotate in a direction counter to a forward travel direction of cold planer machine 10. Rotatable cutter drum 38 can be fixed within housing 32 and configured to cut material of mat or substrate 40 underlying cold planer machine 10.

Anti-slabbing system 14 can be coupled to housing 32 of chamber 34 and can includes an upwardly oriented base plate 42 extending across a front side of cutting chamber 34, a forwardly projecting plow 44 for pushing loose material lying upon substrate 40, and a plurality of skids 46. Sides of cutting chamber 34 adjacent a cutting tool for cutting system 12 can be enclosed by side plates 48.

Primary conveyor 50 can be positioned forward of base plate 42 and can be coupled to and supported upon base plate 42. Primary conveyor 50 can feed material cut from substrate 40 via rotatable cutter drum 38 to secondary conveyor 52 projecting forward of frame end 22. Positioning mechanism 53 may be coupled to secondary conveyor 52, to enable left, right, and up and down position control of secondary conveyor 52. Secondary conveyor 52 can deposit removed substrate 40 into a receptacle, such as the box of a dump truck.

Cold planar machine 10 can also be equipped with partial-cut-width sensor system 18 for determining how much of the width of cutting system 12 (into the plane of FIG. 1) is cutting substrate 40. Partial-cut-width sensor system 18 can include mounting bar 54 and sensor array 56.

Cold planar machine 10 can drive over substrate 40 such that front propulsion elements 26 roll on surface 58. Cold planar machine 10 can be configured to remove substrate 40 from a roadway to leave surface 60 behind. Back propulsion elements 28 can roll on surface 60, with cutting system 12 producing and edge of substrate 40 between surfaces 58 and 60. Surface 60 can comprise a surface from which paving material has been completely removed or a surface of paving material from which an upper-most layer of paving material has been removed.

Cold planar machine 10 can be configured to travel in a forward direction (from left to right with reference to FIG. 1) to remove substrate 40. Anti-slabbing system 12 can travel over the top of substrate 40 to prevent or inhibit substrate 40 from becoming prematurely dislodged during operations for removal of substrate 40. Rotatable cutter drum 38 can follow behind anti-slabbing system 14 to engage substrate 40. Rotatable cutter drum 38 can be configured to rotate counter-clockwise with reference to FIG. 1 such that material of substrate 40 can be uplifted and broken up into small pieces by cutting teeth of rotatable cutter drum 38. Anti-slabbing system 14 can be configured to contain pieces of substrate 40 within cutting chamber 34. Removed pieces of substrate 40 are pushed up primary conveyor 50 and carried forward, such as by an endless belt, to secondary conveyor 52. Secondary conveyor 52 can be cantilevered forward of front frame end 22 to be positioned over a collection vessel, such as the box of a dump truck.

In order to evaluate the operation and performance of cold planar machine 10, cold planar machine 10 can be outfitted with a plurality of sensors. For example, it can be desirable to evaluate productivity measurements of cold planar system 10 in real-time or at the end of an operation. For example, cold planar machine 10 can be configured to remove a certain depth of substrate 40. As such, cold planar machine 10 can include systems for determining a cutting depth of cutting system 12. In combination with the speed of cold planar machine 10 and the width of cutting system 12, the volume of substrate 40 removed for a given period of operation can be determined. Roadways are typically multiple times wider than the width of cold planar system 10. As such, multiple passes of cold planar machine 10 can be used to remove the complete width of substrate 40. However, not all passes of cold planar machine 10, particularly the last pass, extend across a width of substrate 40 that takes up the full width of cutting system 12. If the partial-cut-width is not taken into account, material removal volume calculations can become skewed, particularly when long stretches of roadway material are being removed. Partial-cut-width sensor system 18 can be configured to sense how much of the width of cutting system 12 is actually cutting substrate 40 to increase accuracy of on-board productivity measurements of cutting system 12 of cold planar machine 10.

Figure 2:
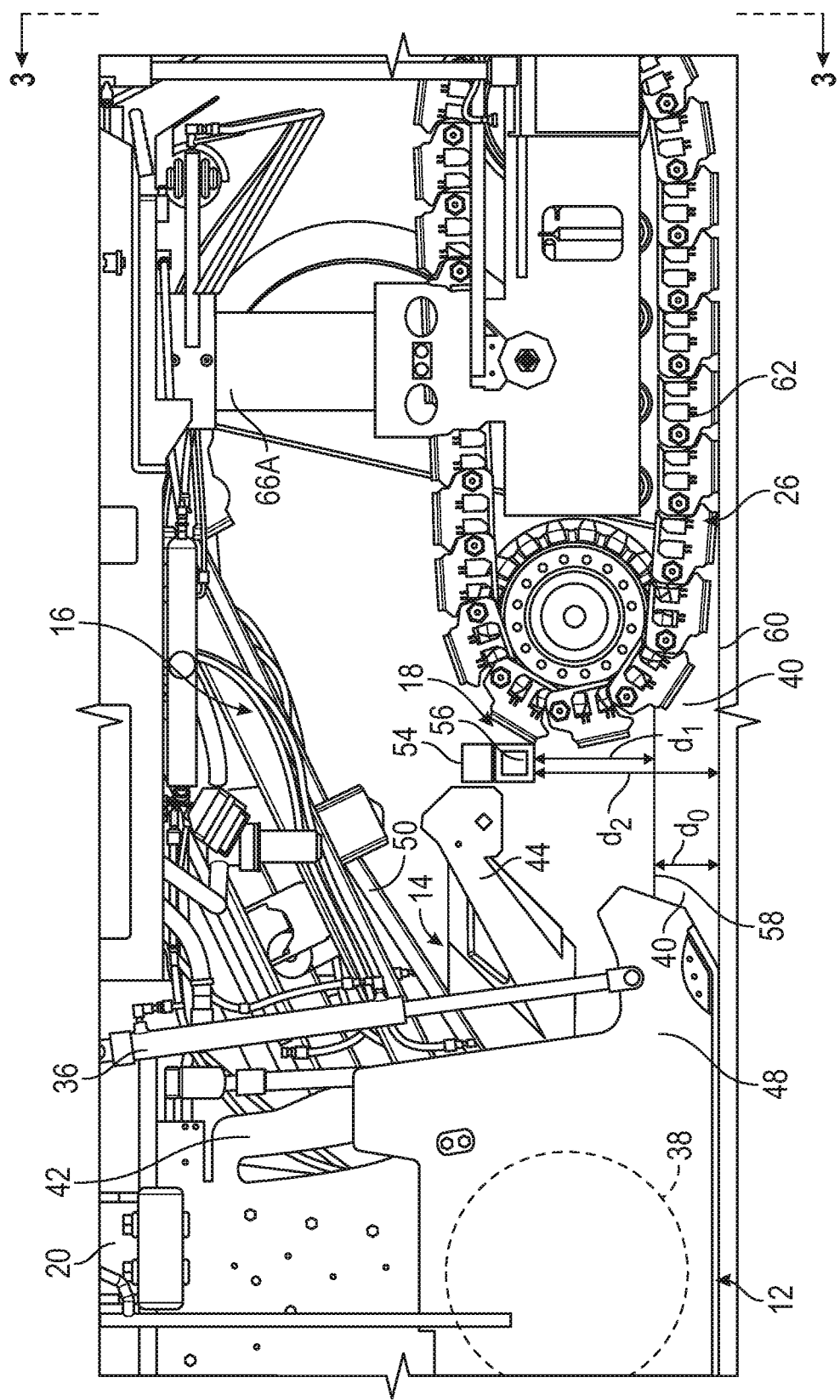
FIG. 2 is a diagrammatic side view of the cutting system, anti-slabbing system, conveyor system and partial-cut-width sensor system of FIG. 1 showing differences in depth of matted and milled roadway surfaces.

FIG. 2 is a diagrammatic side view of cutting system 12, anti-slabbing system 14, conveyor system 16 and partial-cut-width sensor system 18 of FIG. 1 showing differences in depth of matted roadway surface 58 and adjacent milled roadway surface 60.

Figure 4:
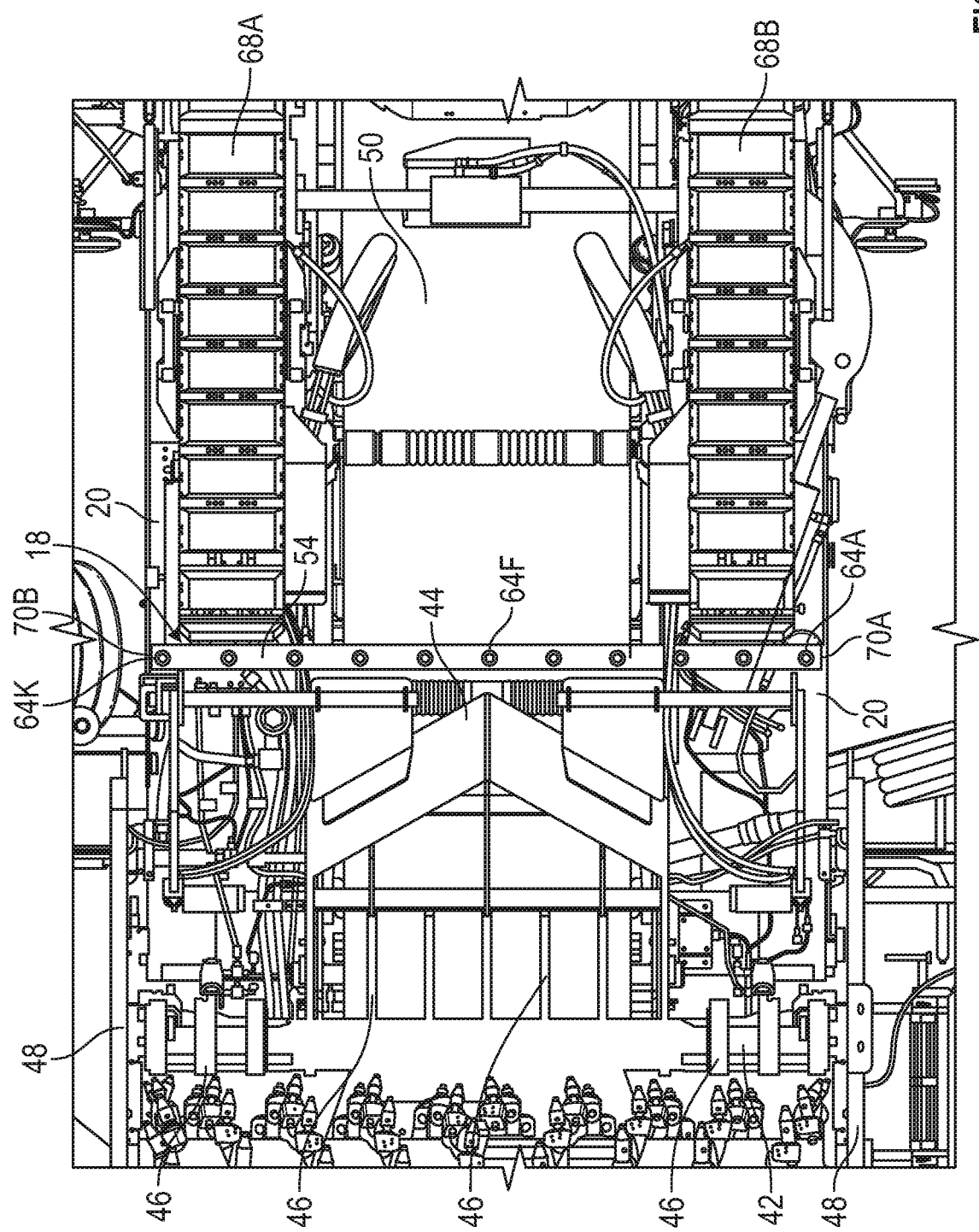
FIG. 4 is a diagrammatic bottom view of the cutting system, anti-slabbing system, conveyor system and partial-cut-width sensor system of FIGS. 2 and 3 showing the location of individual sensors for a partial-cut-width sensor system relative to a frame and cutter drum of the cold planar machine.

Cutting system 12 can comprise rotatable cutter drum 38 positioned behind side plate 48. Side plate 48 can be attached to housing 32 defining chamber 34. Anti-slabbing system 14 can be coupled to housing 32 defining chamber 340 forward of cutter drum 38. Anti-slabbing system 14 can comprise base plate 42, plow 44 and skids 46 (FIG. 4). Primary conveyor 50 can be coupled to anti-slabbing system 14 and can extend from a first end proximate anti-slabbing system 14 to a second end forward of anti-slabbing system 14 within machine 10. Propulsion element 26, which can comprise endless track 62, can be coupled to frame 20 by elevation control leg 66A. Elevation control leg 66A can be operated by controller 84 (FIG. 6) of cold planar machine 10 to change the position of frame 20 relative to substrate 40 to, for example, assist in changing the cutting depth of cutting system 12. Mounting bar 54 of partial-cut-width sensor system 18 can be mounted within cold planar machine 10 in front of cutting system 12 to position sensor array 56 across substrate 40. In an example, mounting bar 54 can be directly connected to frame 20. Additionally, mounting bar can be attached indirectly to frame 29, such as by attachment to an upper portion of anti-slabbing system 14, as shown, for example, in FIG. 4. However, in other examples, a mounting bar, such as mounting bar 76 (FIG. 5), can be attached to frame indirectly, such as through a lower portion of anti-slabbing system 14.

Although shown in an elevated position above substrate 40 in FIG. 2, anti-slabbing system 14 can be lowered to rest on top of substrate 40 at surface 58. Likewise, propulsion element 26 is shown resting on milled roadway surface 60, but can be configured to engage matted roadway surface 58 in operation. Cutting system 12 can be lowered such that side plate 48 rests on previously milled roadway surface 60 adjacent to substrate 40. As propulsion element 26 moves cold planar machine 10 (to the right with reference to FIG. 2) along substrate 40, cutter drum 38 engages an edge of substrate 40. During a full width pass, substrate 40 can extend all the way across cutter drum 38 between side plates 48. As such, a volume calculation of removed substrate 40 can comprise a depth measurement for depth $d_0$ (equal to the difference in distances $d_1$ and $d_2$ for surfaces 58 and 60), a width measurement of cutter drum 38 and a travel distance measurement of cold planar machine 10. As such, only the depth measurement from the cut-depth sensors 92A and 92B (FIG. 6) or control system would be required. However, not all milling operations involve cutting substrate 40 across the full width of cutter drum 38. As such, sensor array 56 can include a plurality of sensors spaced across the width of cold planar machine 10 to determine the proportion of the width of cutter drum 38 that is removing substrate 40.

Figure 3:
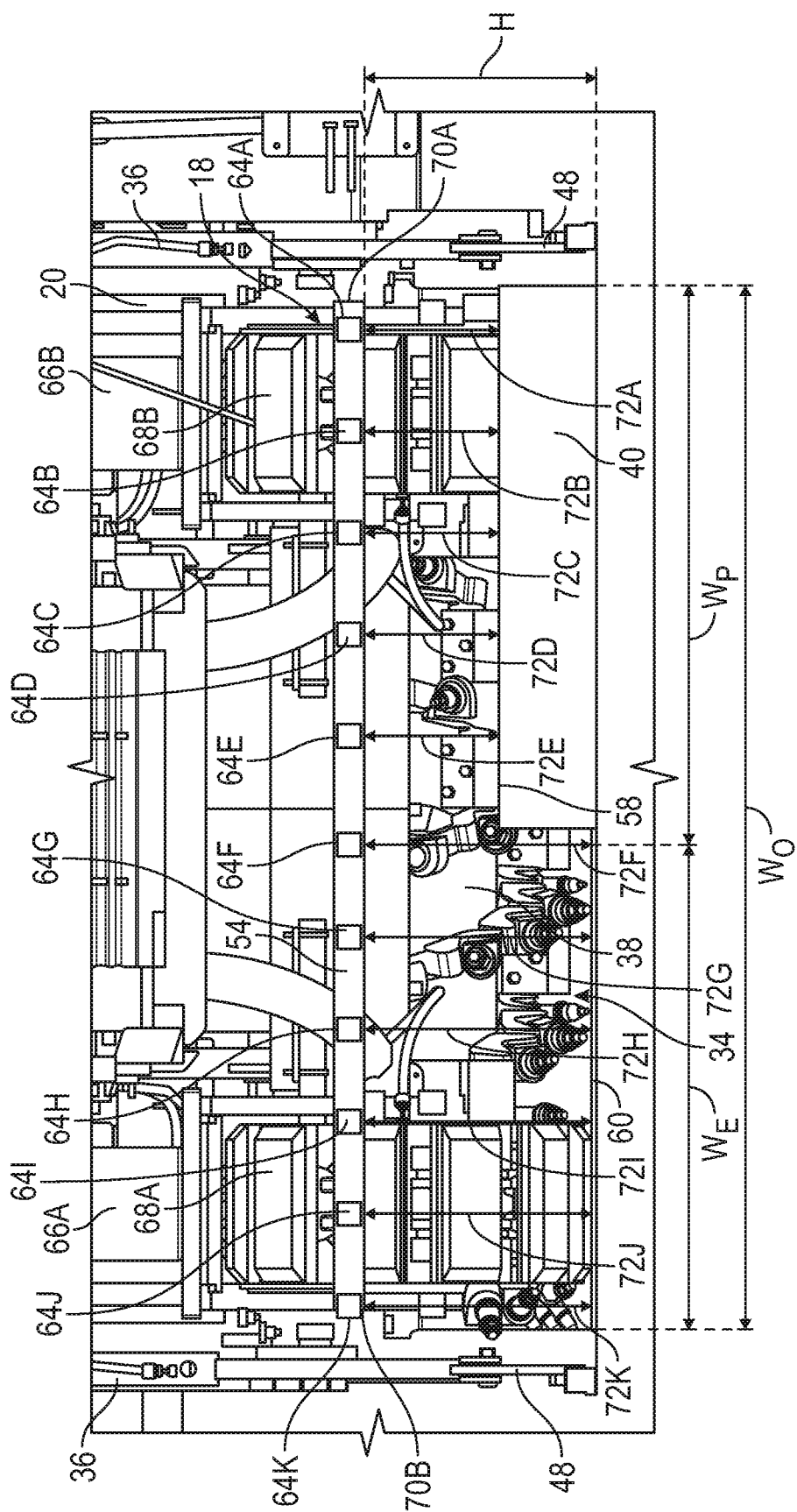
FIG. 3 is a diagrammatic front view of the partial-cut-width sensor system of FIG. 2 showing the location of individual sensors relative to a width of a cutter drum and matted and milled roadway surfaces.

FIG. 3 is a diagrammatic front view of partial-cut-width sensor system 18 of FIG. 2 showing the location of individual depth sensors 64A-64K relative to a width $W_0$ of cutter drum 38 and matted roadway surface 58 and milled roadway surface 60. In FIG. 3, partial-cut-sensor system 18 is illustrated in front of propulsion element 26 for clarity, though, in actuality, sensor mounting bar 54 would be located behind propulsion element 26 forward of cutting system 12, as shown in FIG. 2.

Frame 20 of cold planar machine 10 can support elevation control legs 66A and 66B, which can be used to carry propulsion element 26. Propulsion element 26 can comprise first track 68A and second track 68B. Tracks 68A and 68B can be positioned in front of cutter drum 38 to roll over substrate 40, while cutter drum 38 performs milling operations behind tracks 68A and 68B. As can be seen in FIG. 3, substrate 40 does not always extend all the way across cutter drum 38 between side plates 48. Sensors 64A-64K are positioned on mounting bar 54 (FIG. 4), which can be coupled to frame 20 or anti-slabbing system 14 (FIG. 5) in a plurality of different ways as is discussed with reference to FIGS. 4 and 5.

Figure 5:
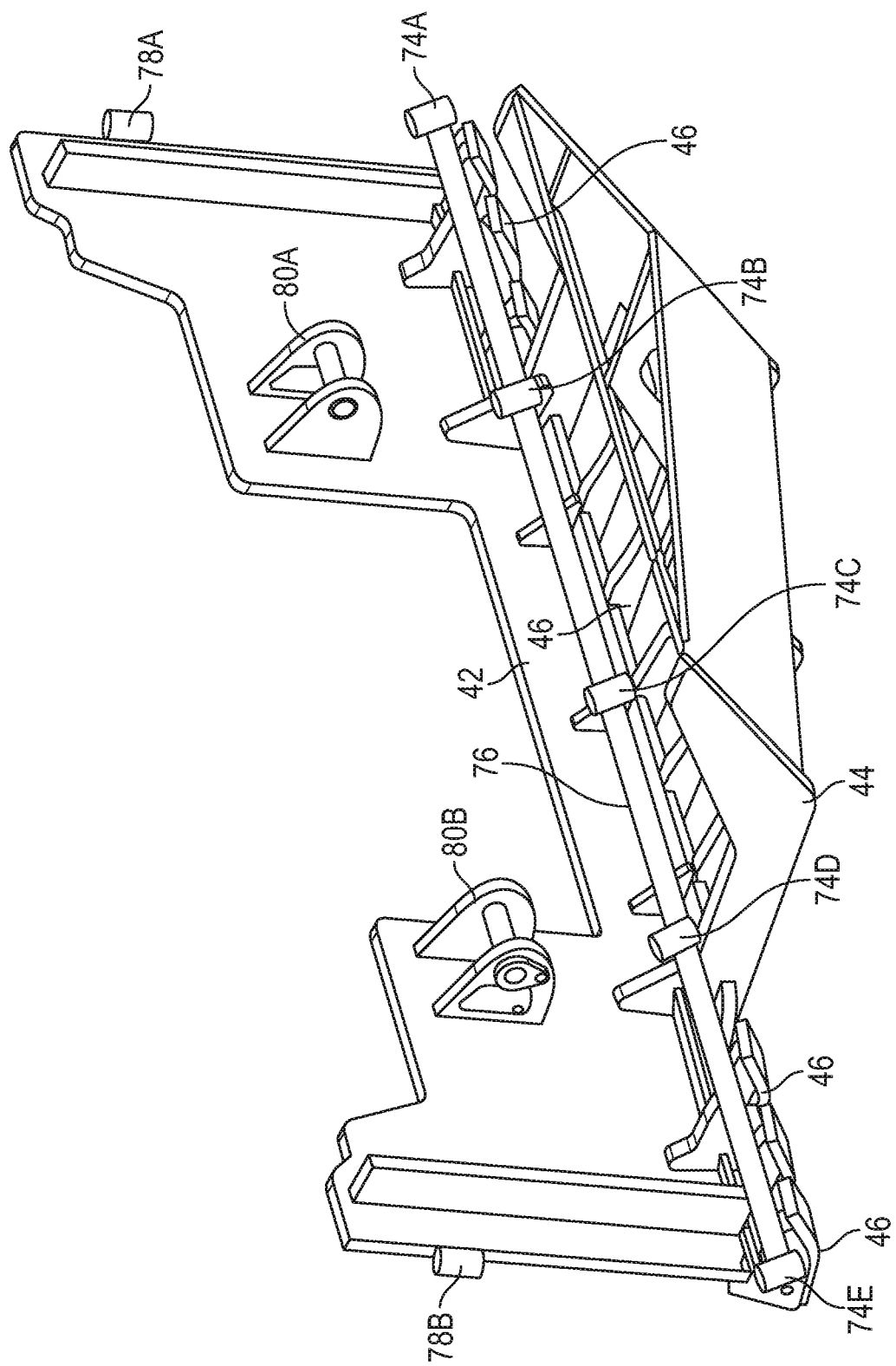
FIG. 5 is a perspective view of an anti-slabbing system for use in a cold planar machine showing the location of individual sensors for a partial-cut-width sensor system.
Figure 6:
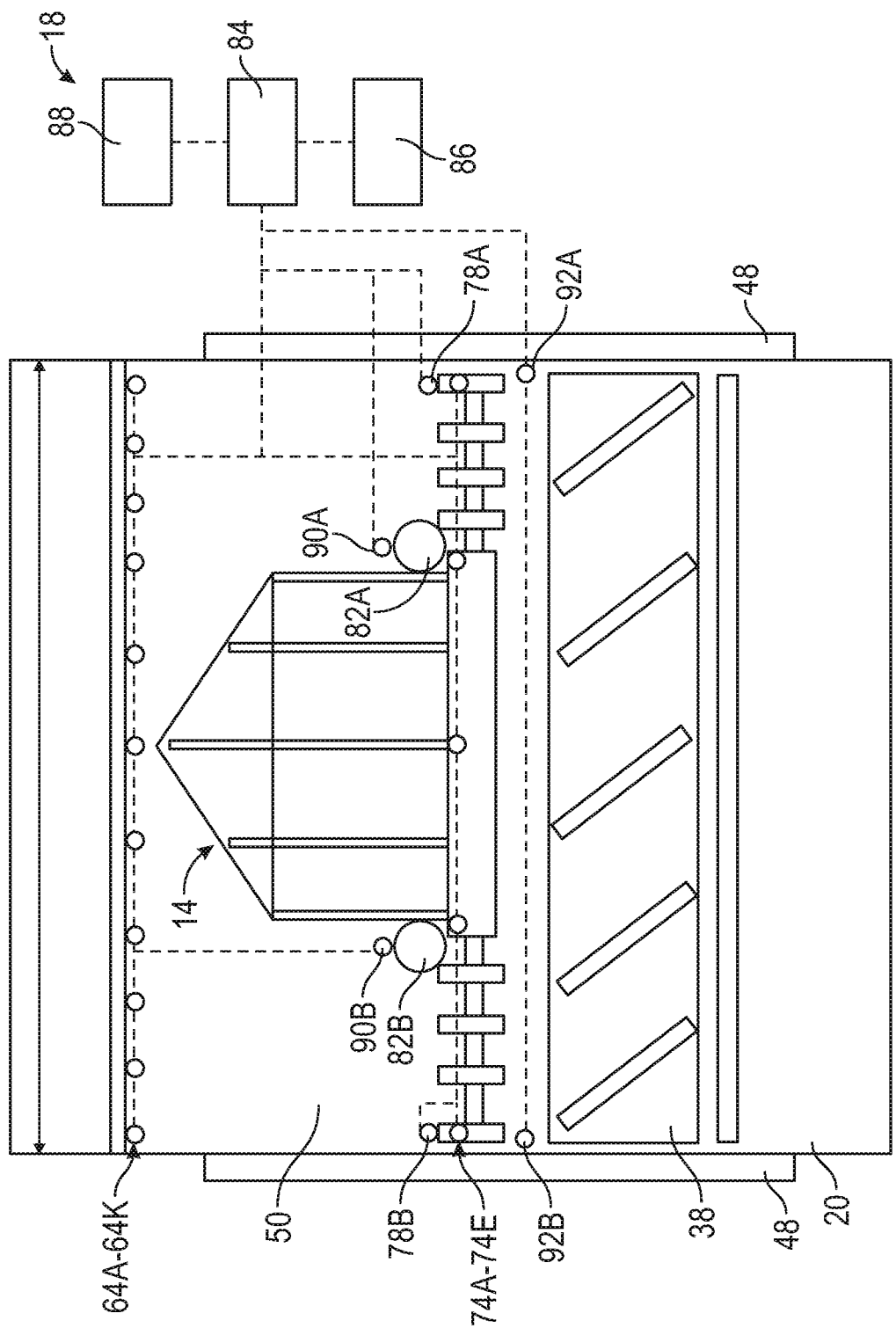
FIG. 6 is a diagrammatic bottom view of a cutting system, anti-slabbing system and conveyor system showing the location of various sensors and a controller that can be used in a partial-cut-width sensor system.

Side plates 48 can be located on opposite sides of cutter drum 38 to define cutting chamber 34. Cutter drum 38 can define cutting or milling width $W_0$. Mounting bar 54 can be attached to cold planar machine 10 to extend across width $W_0$. For example, mounting bar 54 can be attached to frame 20 using any suitable mounting hardware, such as brackets, fasteners, extensions, straps and the like, or anti-slabbing system 14 as shown in FIG. 2 and FIG. 5. Sensors 64A-64K can be positioned across the width of mounting bar 54. For example, sensors 64A-64K can be positioned at regular, predetermined intervals to divide width $W_O$ into segments of a known length that can be stored in memory device 86 (FIG. 6). The position of mounting bar 54 relative to the underside of cold planar machine 10 can be located in a known or predetermined location. For example, the height H of mounting bar 54 above the bottom of tracks 68A and 68B can be used as a baseline for determining a cutting or milling depth. The locations and lengths of the segments and height H can be stored in memory 86 connected to controller 84 (FIG. 6) and can be used to calculate or determine partial-cut-widths of cutter drum 38.

Sensors 64A-64K can sense the distances between mounting bar 54 and the surface that is below each of sensors 64A-64K. Sensor 64A can be located at first end 70A of mounting bar 54 and sensor 64K can be located at second end 70B. Sensor 70F can be located halfway between sensors 64A and 64F. As such, at a minimum, sensors 64A-64K can divide cutting width $W_o$ into two segments. However, in other examples, sensors 64A-64K can divide width $W_o$ into four segments using sensors 64C and 64H. In the example shown in FIG. 3, sensors 64A-64K divide width $W_o$ into ten segments. The greater the number of segments that width $W_o$ can be divided into, the greater resolution of the partial-cut-width can be obtained.

As will be discussed in greater detail with reference to FIG. 7, sensors 64A-64K can be fired, or activated, and measurements therefrom can be used in different ways to determine how much of width $W_O$ is actually cutting substrate 40. As shown in FIG. 3, sensors 64A-64K can emit sensor signals 72A-72K that can be used in conjunction with controller 84 (FIG. 6) to determine a relative thickness of substrate 40 being removed by cutter drum 38 at the location of each of sensors 64A-64K. Sensors 64A-64K need not sense an actual thickness of substrate 40, as other sensors, such as sensors 92A and 92B described with reference to FIG. 6 can provide such function. However, sensors 64A-64K can be configured to sense the thickness of substrate 40 in various examples. Furthermore, sensors 64A-64K need not sense an absolute distance of surfaces 58 and 60 from any specific reference point, as partial-cut-width determinations can be determined only by differences in each of sensor signals 72A-72K relative to each other. Sensor signals 72A-72K can bounce off matted roadway surface 58 or milled roadway surface 60 and return to sensors 64A-64K to provide a distance measurement. In various examples, sensors 64A-64K can comprise acoustic sensors, sonic sensors, laser sensors and the like, or other distance, level, proximity or presence sensors. In an example, sensors 64A-64K can comprise non-contact sonic sensors, however, in various embodiments, contact sensors can be used, such as magnetic coil sensors and sensors incorporating a scale.

In an example, the measurements taken for each of sensors 64A-64K can be averaged together and the average distance measurement can be compared to each individual distance measurement. For differences between the average distance measurement and the individual distance measurement that are less than the average, controller 84 can determine substrate 40 is present. For differences between the average distance measurement and the individual distance measurement that are greater than the average, controller 84 can determine that substrate 40 is not present. For the sensors where substrate 40 is determined to not be present, the portion of width $W_O$ over which those sensors extend $W_E$ can be subtract from width $W_O$ to determine an actual cut width $W_P$. Additionally, a ratio of the sensors sensing depth d1 versus the total number of sensors can be used to determine the partial cut width $W_P$.

In another example, individual sensor measurements can be compared directly to adjacent sensor signals to determine a location along width $W_O$ where substrate 40 ends.

FIG. 4 is a diagrammatic bottom view of cutting system 12, anti-slabbing system 14, conveyor system 16 and partial-cut-width sensor system 18 of FIGS. 2 and 3 showing the location of individual sensors 64A-64K for partial-cut-width sensor system 18 relative to cutter drum 38 of cold planar machine 10.

Mounting bar 54 can extend across cold planar machine 10 out front of cutting drum 38. Mounting bar 54 can be attached to frame 20 at first end 70A and second end 70B aft of primary conveyor 50 and propulsion element 26 and forward of anti-slabbing system 14. In additional examples, mounting bar 54 can be attached to the forward portion of plow 44 of anti-slabbing system 14, as shown in FIG. 2, or on other locations of anti-slabbing system 14, as shown in FIG. 5. In other embodiments, a mounting bar of the present application can be mounted to primary conveyor 50, such as on structural components supporting a rotating belt of conveyor 50 that can be supported by frame 20.

FIG. 5 is a perspective view of anti-slabbing system 14 for use in cold planar machine 10 showing the location of individual depth sensors 74A-74E for partial-cut-width sensor system 18. Sensors 74A-74E can be attached to mounting bar 76. Anti-slabbing system 14 can comprise base plate 42, plow 44 and skids 46. Mounting bar 76 can be attached in front of base plate 42 and sensors 74A-74E can be mounted thereto for sensing in between skids 46. In other examples, mounting bar 76 can be mounted behind base plate 42 to reduce interference from skids 46 on sensors 74A-74E. In other examples, sensors 74A-74E can be directly mounted to anti-slabbing system 14 without the aid of mounting bar 76. Also, mounting bar can be attached to plow 44 as shown in FIG. 2.

Anti-slabbing system 14 can also comprise location or level sensors 78A and 78B, which can be used to sense the position of anti-slabbing system 14 relative to frame 20 and substrate 40. Anti-slabbing system 14 can include anchor points 80A and 80B for coupling to other components of cold planar machine 10. In an example, anchor points 80A and 80B can be coupled to primary conveyor 50. Anti-slabbing system 14 can be raised and lowered through coupling with elevation control legs 66A and 66B (FIGS. 1-3). In other examples, actuators 82A and 82B (FIG. 6) can be coupled directly to anti-slabbing system 14. Primary conveyor 50 can be coupled to anti-slabbing system 14 at anchor points 80A and 80B. Actuators 82A and 82B (FIG. 6), or alternatively or in conjunction with elevation control legs 66A and 66B (FIG. 3) can raise and lower anti-slabbing system 14 to accommodate different cutting depths or different thicknesses of substrate 40. Sensors 78A and 78B can be used to determine the position of anti-slabbing system 14, which can be used to determine the height of sensors 74A-74E above substrate 40. The height of anti-slabbing system 14 can be provided to controller 84 and stored in memory device 86 (FIG. 6). Anti-slabbing system 14 can be provided with other sensors, such as to determine the orientation of anti-slabbing system 13, e.g., if anti-slabbing system 14 is level relative to substrate 40, as discussed with reference to FIG. 6.

FIG. 6 is a diagrammatic bottom view of cutter drum 38, anti-slabbing system 14 and primary conveyor 50 showing the location of various sensors 64 and 74 and controller 84 that can be used in partial-cut-width sensor system 18. Controller 84 can be coupled to memory device 86 and output device 88. Sensors 78A and 78B can be mounted to anti-slabbing system 14 to sense the height of skids 46 above substrate 40. Additionally, anti-slabbing system 14 can include position or height sensors 90A and 90B that can be configured to determine the length of actuators 82A and 82B, which can be used to determine if anti-slabbing system 14 is level with respect to surfaces disposed underneath skids 46. Cold planar machine 10 can include depth sensors 92A and 92B, which can be used to determine the depth of cutting or milling of cutter drum 38. In examples, depth sensors 92A and 92B are mounted to anti-slabbing system 14. In examples, though not illustrated as such, depth sensors 92A and 92B can be configured as side gate position sensors.

Controller 84 can receive inputs from partial-cut-width sensors 64A-64K or 74A-74E, anti-slabbing system level sensors 78A and 78B, height sensors 90A and 90B and cut-depth sensors 92A and 92B. Likewise, controller 84 can receive inputs from cold planar machine 10 regarding the speed of cold planar machine 10, e.g., the speed of propulsion elements 26 and 28, and the speed of conveyors 50 and 52 to perform various calculations, such as those described herein.

Figure 7:
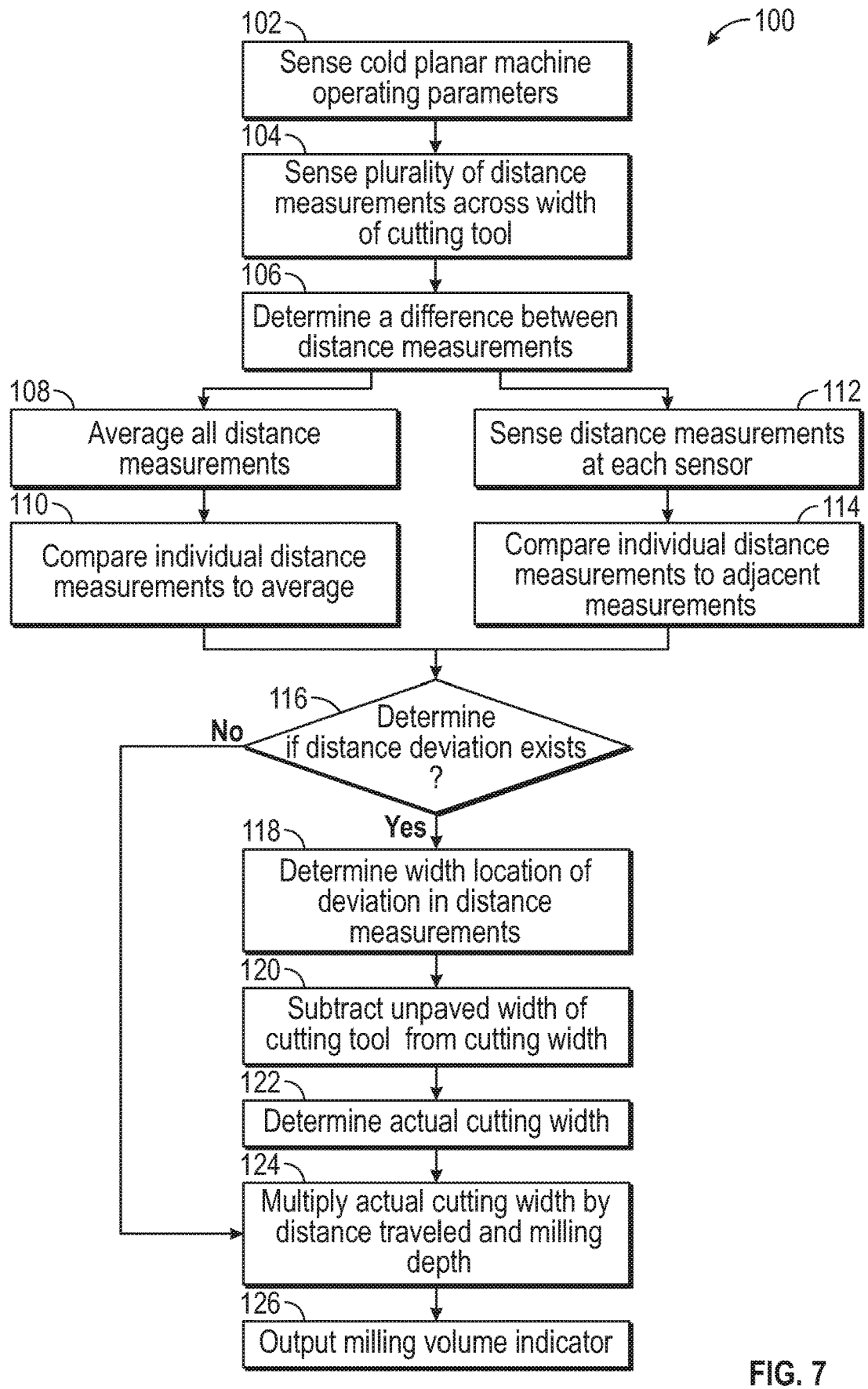
FIG. 7 is a line diagram showing methods for determining partial-cut-width in a cold planar machine using partial-cut-width sensor systems of FIGS. 1-6.

FIG. 7 is a line diagram showing method 100 for determining partial-cut-width in cold planar machine 10, such as can be done with the systems and methods described herein.

At step 102, various operating parameters of cold planar machine 10 can be sensed or input into controller 84. For example, cut depth do can be sensed using sensors 92A and 92B. The speed of cold planar machine 10 can be sensed by controller 84. The height, position and orientation of anti-slabbing system 14 can be sensed using level sensors 78A and 78B and sensors 90A and 90B. Also, the nominal width $W_O$ of cutter drum 38 can be input into controller. The operating parameters can be stored in memory device 86. In other examples, various operating parameters of cold planar machine 10 can be input into controller 84 via a user input device.

At step 104, distance measurements across width $W_O$ of cutter drum 38 can be sensed, such as with sensors 64A-64K and sensors 74A-74E. Cold planar machine 10 can include both sets of sensors 64A-64K and 74A-74E or only a one set of sensors 64A-64K and 74A-74E. For example, sensor signals 72A-72K can be emitted from sensors 64A-64K and returned back to sensors 64A-64K, respectively, after bouncing off either matted roadway surface 58 or milled roadway surface 60. In an example, sensors 64A-64K can be sequentially fired from 64A-64K in order to, for example, reduce interference between adjacent sensors. Also, differences in the height of sensors 64A-64K due to, for example, anti-slabbing system 14 being unlevel relative to surfaces 58 and 60, can be accounted for with level sensors 78A and 78B. In other examples, sensors 64A-64K can be fired simultaneously.

At step 106, differences in measurements between sensors within a single sensor array 64A-64K or 74A-74E. Signals 72A-72K can be evaluated relative to an aggregated distance measurement at steps 108 and 110, or relative to each other at steps 112 and 114. In examples, distance measurements between sensors 64A-64K and/or sensors 74A-74E and surfaces 58 and 60 can be determined on a relative basis. That is, in order to determine a partial-cut-width, it is only necessary to find out the difference in distances that are being sensed by sensors 64A-64K and/or sensors 74A-74E because partial-cut-width sensor system 18 is primarily concerned with determining a width location along width $W_O$ and not necessarily a length along depth do, although sensor system 18 can be configured to do so in various examples. Thus, in other examples, the absolute distance determined by sensors 64A-64K and/or sensors 74A-74E from a reference location, such as frame 20, can be determined using 78A and 78B or 90A and 90B.

At step 108, the average distance measurements from sensor signals 72A-72K can be calculated. For example, with reference to FIG. 3, sensors 64A-64E will sense distance $d_1$, while sensors 64F-64K will sense distance d2. Because there are more distance measurements for distance d2, the average will be closer to d2 than $d_1$.

At step 110, individual measurements from sensor signals 72A-72F can be compared to the average. Measurements from sensor signals 72A-72E will be less than the average, indicating that sensors 72A-72E are sensing a surface closer to the sensors, which can indicate the presence of substrate 40. A measurement from sensor signal 72F will jump to being greater than the average, indicating a surface further away from the sensors, which can indicate the absence of substrate 40. Such a switch from adjacent sensor signals 72E to sensor signal 72F can indicate that substrate 40 is not being sensed by sensor 64F. Likewise, measurements from sensor signals 72G-72K will be greater than the average, also indicating that substrate 40 is not being sensed.

Alternative, or in addition, to steps 108 and 110, controller 84 can perform steps 112 and 114, to also determine the location of milled roadway surface 60 along width $W_O$.

At step 114, individual measurements from sensor signals 72A-72F can be compared to individual measurements from adjacent sensor signals of sensor signals 72A-72F. For example, sensor signal 72A can be compared to sensor signal 72B, sensor signal 72B can be compared to sensor signal 72A and 72C, and so on.

At step 116, controller 84 can determine if a deviation from adjacent distance measurements exists to determine if a partial-cut-width is being sensed. If a deviation is not sensed, controller 84 can proceed to step 124. If a deviation is sensed, controller 84 can proceed to step 116 to determine the location of the deviation along width $W_O$.

At step 118, the location of the deviation across width $W_O$ of cutter drum 38 can be determined. For example, with reference to FIG. 3, since controller 84 can determine that sensor 64F is not sensing substrate 40 and that sensors 64G-64K are also not sensing substrate 40, controller 84 can determine that cutter drum 38 is not cutting substrate 40 from approximately the location of sensor 64F to second end 70B.

At step 120, width $W_E$ can be subtracted from width $W_O$ to determine the partial-cut-width $W_P$. A greater number of sensors placed along width $W_O$ can produce a better indication of where exactly substrate 40 ends to improve the partial-cut-width determination. Alternatively, the ratio of sensors sensing the greater depth $d_2$ versus the total number of sensors actively sensing can be used to determine the partial-cut-width $W_P$.

At step 122, the partial-cut-width $W_P$ can be determined by controller 84 and stored in memory device 86.

At step 124, either full cut-width $W_O$ or partial-cut-width $W_A$ can be used in various onboard productivity measurements. In particular, partial-cut-width $W_P$ can be used to determine tonnage or volume of substrate 40 that is removed. For example, the volume of material removed is a function of the cross-sectional area of substrate 40 being removed. Thus, cutting width $W_O$ of cutter drum 38 can be multiplied by cutting depth do to determine the nominal cross-sectional area for a full cut. For partial-cut-width determinations, the cross-sectional area of the cutting area is partial-cut-width $W_P$ multiplied by cutting depth do. The cross-sectional areas can then be multiplied by length of substrate 40 removed, which is a function of the distance traveled by cold planar machine 10. The distance traveled by cold planar machine 10 can be determined by controller 84 using a speed parameter determined from speed sensors used in conjunction with propulsion elements 26 and 28 or other inputs. The speed parameter can be multiplied by the operating time of cold planar machine 10 to determine distance, which can be multiplied by the cross-sectional area of material removed to determine removed material volume. Volume can be multiplied by material specific information, such as density, to determine tonnage.

At step 126, controller 84 can output various visual indicators of the performance of cold planar machine 10 at output device 88, which may comprise a display screen or monitor or the like.

INDUSTRIAL APPLICABILITY

The present application describes various systems and methods for partial-cut-width sensing that can be used in cold planar machines that can operate to remove old or degraded paving material from roadway surfaces. Cold planar machines can include monitoring systems that can be used for onboard productivity measurements. Such measurements can be used to track the efficiency of operations of the cold planar machines. For example, such measurements can help in estimating milling bit usage and the time it will take to complete a cold planar operation.

Previous sensor systems used to monitor milling or cutting operations are not always capable of accurately determining cut-width and therefore would always estimate the full cut-width for all operations. Such estimates can grossly overestimate the amount of roadway material that is to be removed, which can therefore overestimate the number of milling bits that will be consumed in the process.

Other sensing systems have only included one sensor. Such systems can be susceptible to failure if the sole sensor becomes disabled. Such systems can also be prone to inaccuracy if the view of the sensor becomes obstructed. Additionally, such systems can require complex computations that unnecessarily increase computing expense and time.

The partial-cut-width sensor systems and methods of the present application can provide more accurate cutting width determinations to improve the material volume and tonnage removal outputs. These more accurate outputs can therefore, for example, provide more accurate determinations of how much wear on milling bits has occurred, thereby reducing the cost associated with replacing milling bits and labor time associated with changing milling bits.

What is claimed is:

1. A system for sensing partial-cut-width in a cold planar machine, the system comprising:
   a cold planar frame;
   a cutting system mounted to the cold planar frame, the cutting system comprising a cutting tool extending across a cutting path about a rotational axis;
   a plurality of depth sensors positioned across the cutting path configured to obtain depth measurements at a plurality of regular, predetermined intervals to divide the cutting path into segments of a known length;
   a memory device having stored therein non-transitory data including the plurality of regular, predetermined intervals and a width of the cutting path; and
   a controller electronically coupled to the plurality of depth sensors and the memory device, the controller configured to determine a partial-cut-width of material in front of the cutting tool from output of the plurality of depth sensors.

2. The system of claim 1, wherein the plurality of depth sensors comprises:
   a first sensor positioned at a first edge of the cutting path;
   a second sensor positioned at a second edge of the cutting path; and
   a third sensor positioned between the first sensor and the second sensor.

3. The system of claim 2, wherein the plurality of depth sensors comprises five or more sensors positioned at predetermined intervals to divide a width of the cutting tool into segments.

4. The system of claim 1, further comprising an anti-slabbing system coupled to the cold planar frame, the anti-slabbing system comprising:
   a base plate extending across a width of the cutting path; and
   a plurality of skids mounted to the baseplate at intervals along the width of the cutting path in positions to engage the cutting path;
   wherein the plurality of depth sensors is mounted to the anti-slabbing system.

5. The system of claim 4, wherein the plurality of depth sensors is mounted to the baseplate of the anti-slabbing system.

6. The system of claim 4, further comprising a position sensor system for the anti-slabbing system, the position sensor system configured to sense a height of the anti-slabbing system relative to a roadway surface.

7. The system of claim 6, wherein the position sensor system is configured to sense an orientation of the anti-slabbing system relative to the roadway to determine if the anti-slabbing system is level.

8. The system of claim 1, further comprising a sensor mounting bar coupled to the cold planar frame to extend across the cutting path and forward of the cutting tool relative to a direction of travel of the cold planar machine, wherein the plurality of depth sensors is mounted to the sensor mounting bar.

9. The system of claim 8, wherein:
   each of the plurality of depth sensors comprises a non-contact distance sensor configured to sense a depth between the sensor mounting bar and a milled or un-milled surface of the cutting path; and
   the memory device is configured to store the depth sensed by each of the plurality of depth sensors.

10. The system of claim 1, wherein the controller is configured to determine differences in cut depth distances between individual sensors of the plurality of depth sensors to determine a proportion of the cutting path along which paving material is actively being removed.

11. The system of claim 1, further comprising:
   a cut-depth sensor configured to sense a depth of paving material being removed; and
   a speed sensor configured to sense a speed of the cold planar machine;
   wherein the controller is configured to determine and output an indicator of a removed paving material volume.

12. A method for sensing partial-cut-width in a cold planar operation, the method comprising:
- storing in memory a plurality of regular, predetermined intervals across a cut width of a cutting tool of a cold planer machine between a first end and a second end;
- sensing a plurality of depth distances at the plurality of regular, predetermined intervals across the cut width of the cutting tool of the cold planar machine between the first end and the second end;
- determining a difference in depth distances of the plurality of depth distances;
- determining a location for the difference in depth distances along the cut width;
- determining a portion of the cut width based on the determined location of the difference in depth distances to determine a partial-cut-width; and
- outputting a partial-cut-width indicator with an output device.

13. The method of claim 12, wherein determining a difference in depth distances of the plurality of depth distances comprises determining a difference between adjacent depth distances.

14. The method of claim 12, wherein determining a difference in depth distances of the plurality of depth distances comprises:
- determining an average depth distance for all of the plurality of depth distances; and
- comparing each depth distance of the plurality of depth distances to the average depth distance.

15. The method of claim 12, further comprising:
- measuring or receiving an input of a material thickness of material to be removed by the cold planar operation; and
- comparing the material thickness to the determined difference.

16. The method of claim 15, further comprising:
- measuring or receiving an input of cold planar machine speed; and
- calculating a removed material volume based on the determined partial-cut-width, the input of cold planar machine speed and the material thickness; and
- outputting an indicator of removed material volume.

17. The method of claim 12, wherein sensing the plurality of depth distances comprises simultaneously sensing the plurality of depth distances using a plurality of non-contact distance sensors.

18. The method of claim 12, wherein sensing the plurality of depth distances using the plurality of non-contact distance sensors further comprises sequentially activating each non-contact distance sensor from a first end of the cut width to a second end of the cut width.

19. The method of claim 12, wherein:
- sensing the plurality of depth distances further comprises sensing a position of the plurality of non-contact distance sensors above a roadway surface to calibrate the sensed depth distances; and
- determining a portion of the cut width based on the determined location of the difference in depth distances to determine a partial-cut-width comprises determining a difference between a transition between where the roadway surface is uncut and the roadway surface is cut.

20. The method of claim 12, wherein:
- the plurality of depth distances are sensed with a plurality of sensors mounted to a cold planar machine; and
- the memory and the output device are mounted to the cold planar machine.

\* \* \* \* \*